Inventors
George Hazelton
John W. Pratt
By their Attorney

Inventors
George Hazelton
John W. Pratt
By their Attorney

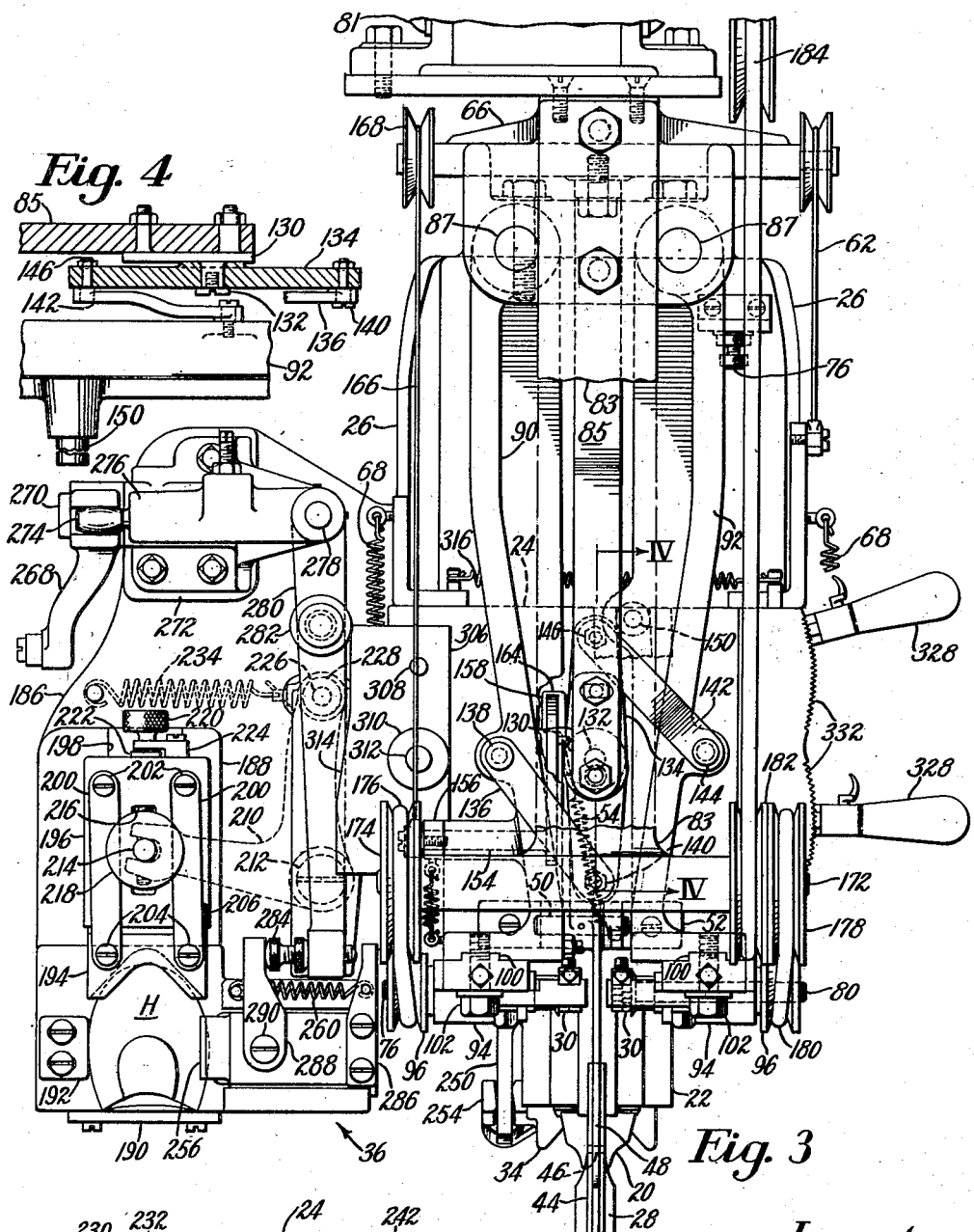

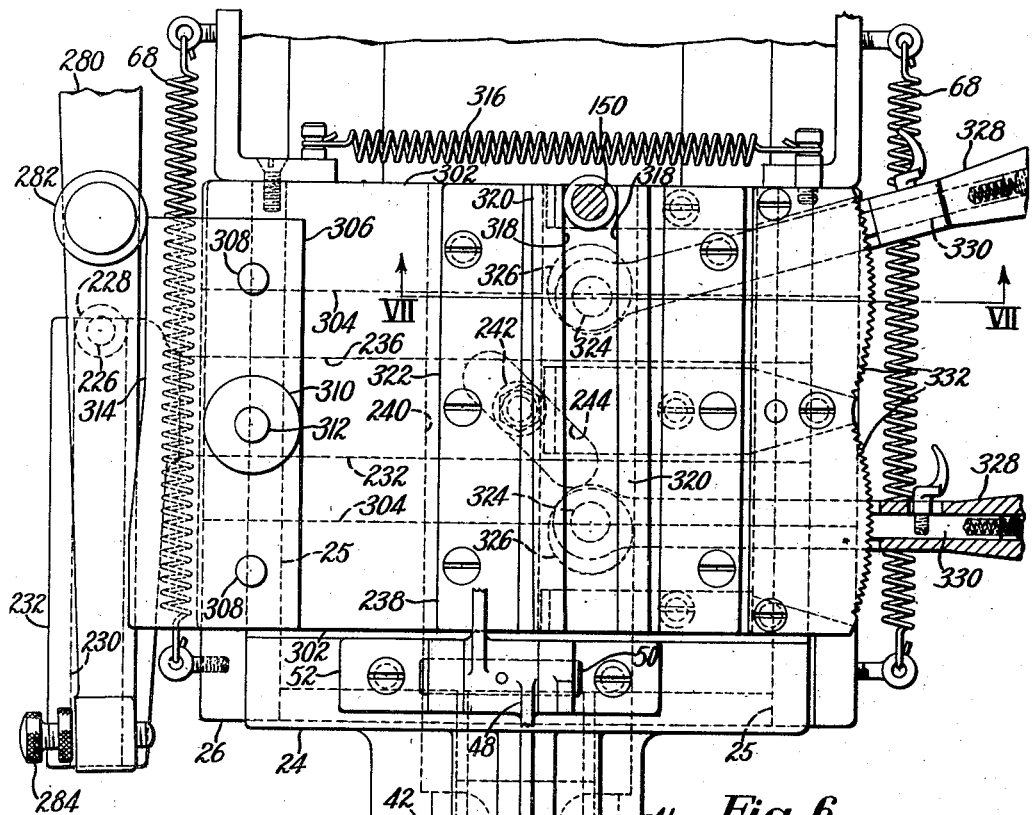
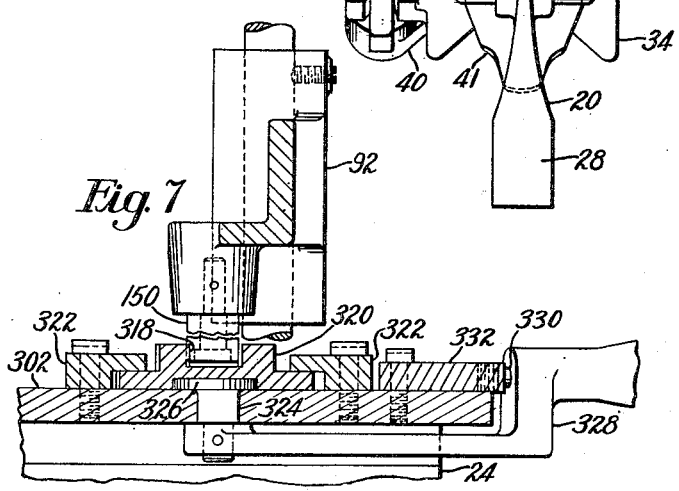

Nov. 2, 1954 G. HAZELTON ET AL 2,692,999
HEEL BREAST FLAP SHAPING MACHINE
Filed Nov. 18, 1952 8 Sheets-Sheet 6

Inventors
George Hazelton
John W. Pratt
By their Attorney

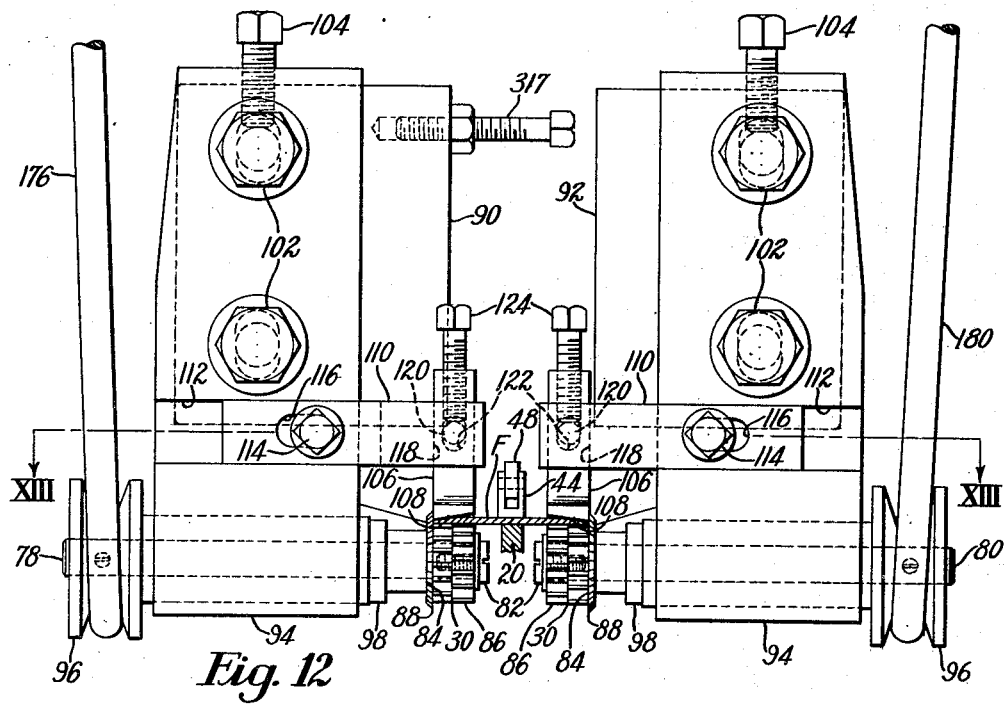
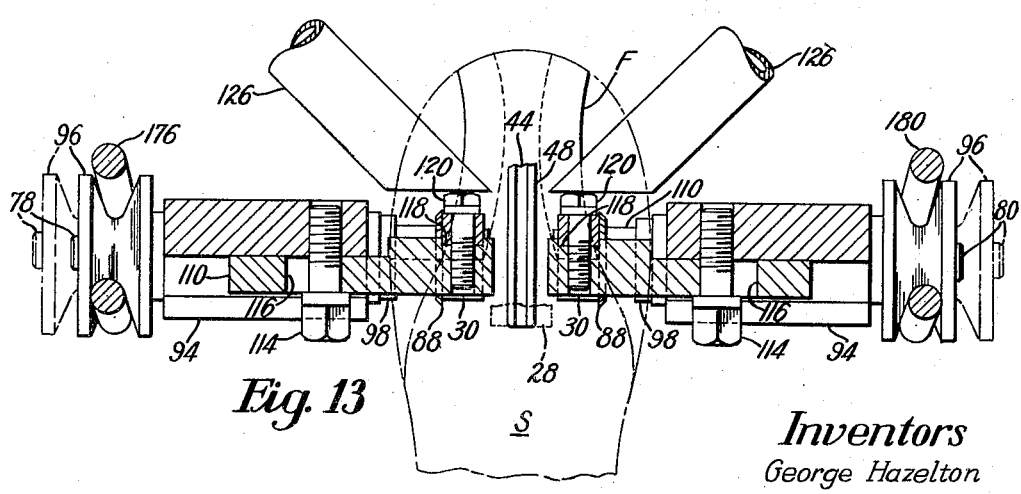

Nov. 2, 1954　　G. HAZELTON ET AL　　2,692,999
HEEL BREAST FLAP SHAPING MACHINE
Filed Nov. 18, 1952　　8 Sheets-Sheet 8
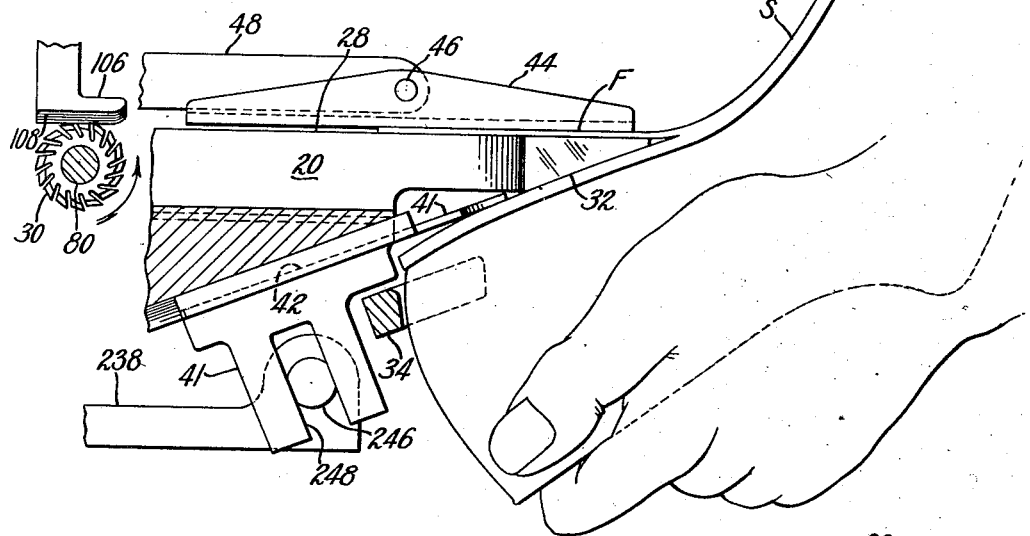
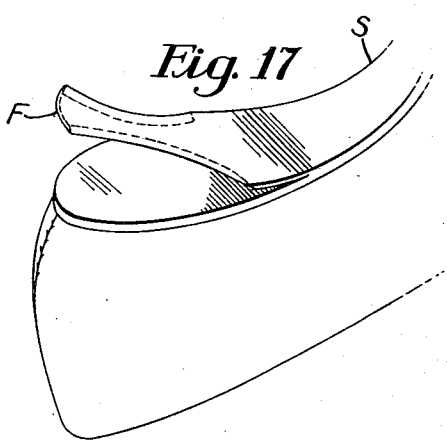
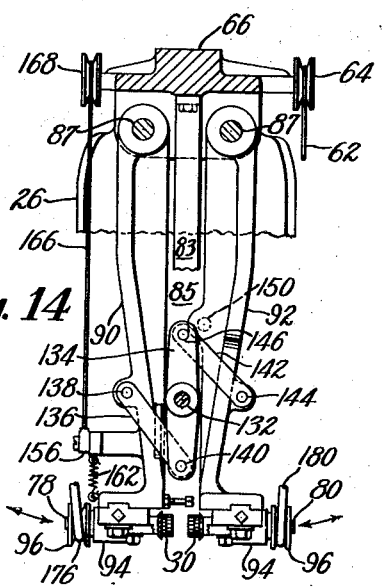
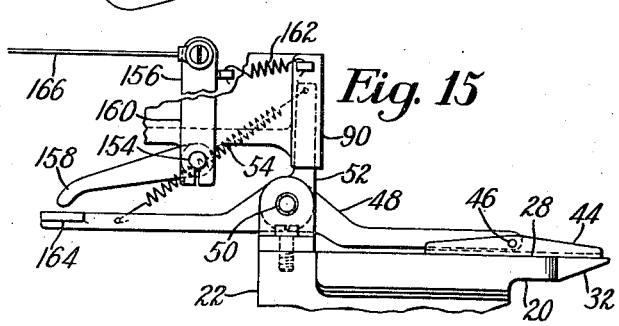
Inventors
George Hazelton
John W. Pratt
By their Attorney

United States Patent Office 2,692,999
Patented Nov. 2, 1954

2,692,999

HEEL BREAST FLAP SHAPING MACHINE

George Hazelton and John William Pratt, Leicester, England, assignors to United Shoe Machinery Corporation, Flemington, N. J., a corporation of New Jersey Application November 18, 1952, Serial No. 321,122

Claims priority, application Great Britain March 22, 1952

5 Claims. (Cl. 12—16.2)

This invention relates to machines for shaping work pieces as by skiving and trimming and is herein illustrated as embodied in a machine for operating on the heel flap of a sole on a shoe to prepare the flap for attachment to the breast face of a Louis heel. It is to be noted that the invention in some aspects is not necessarily limited in its application to machines for operating on soles, attached or unattached, but may be used in shaping other shoe parts such as counters, for example, or may even be applied to work pieces unrelated to footwear.

In making shoes which are to be provided with Louis heels it has been the practice to thin the margins of the heel flap portion either of a sole already attached to a shoe bottom or of a corresponding portion of an unattached split sole. The reduced heel flap may then also be trimmed along its sides either before or after it is attached to a heel breast. In shaping the heel breast flap for the better grades of shoes to accord with the face of a particular heel to be covered it is highly desirable from the standpoint of finer quality and appearance that the edges of the flap, which is an extension of the tread face of the sole, be made uniformly thin—nearly razor thin—and that the root and central portion of the flap be of greater thickness. It is found that attaching a thick flap to a heel breast and then skiving its margins will remove the grain surface so as to impair the finished appearance, and further that skiving the flesh side of a breast flap of an unattached sole may later require trimming away unequal marginal strips when the sole has been attached thereby exposing irregular and unseemly heel breast edges. Accordingly, heel breast flap fitting has hitherto been done largely by hand on the more expensive shoes and the process has been both costly and time consuming.

In view of the above considerations an object of this invention is to provide an easily operable machine for speedily and satisfactorily shaping a work piece, such as a heel breast flap, for example, to accord accurately with the form of any particular surface configuration to be covered, such as that of the breast face of a Louis heel. To this end and as a feature of the invention the illustrative machine hereinafter to be described comprises improved power means for reducing and trimming simultaneously the marginal portions of the heel breast flap of a sole attached to a shot bottom, said means being arranged to operate on the flesh side of said flap. A further feature of the invention as herein exemplified resides in the provision, in combination, of a pair of rotary compound cutters mounted for movement axially toward and from one another, widthwise of a shoe, a work support for progressively carrying a heel flap of a sole on the shoe lengthwise into operative engagement with said cutters, means operative by such carrying movement of the support for controlling widthwise movement of the cutters in accordance with the shape of the breast of a heel to be attached, and a gaging device for limiting lengthwise of the shoe the extent of effective engagement of the flap with the cutters.

The machine herein shown includes a novel work support and means for clamping thereon the central lengthwise portion of a heel flap of a sole attached to an inverted shoe. To present the flap thus supported and raised from the heel seat to the operative elements of the machine an operator tilts the inverted shoe heel end down, the heel end then abutting a heel end gage adjustably positioned below the support to determine the length of the flap overlying the support and to be shaped. Means, treadle actuated in the illustrative machine, are provided for moving the work support to carry the clamped flap progressively into operative engagement with a pair of power driven skiving-trimming cutters. The latter are arranged to be moved simultaneously together and apart along paths substantially at right angles to the path of the work support for operation, respectively, on the under or flesh side of opposite marginal portions of the flap. As the work support is moved to carry the clamped portion of a flap along a path midway between the rotary cutters, the opposite side margins of the flap are respectively fed under a formed guide or brace and thereby held in operative engagement with one of the compound cutters and the flesh sides of said margins are simultaneously skived and trimmed.

During work feeding movement the cutters are moved widthwise of the shoe, together or apart in unison, to shape the flap to fit the breast of the heel to be attached to the shoe. Accordingly, for the purposes in view a novel gage device is employed to control the distance by which the trimming cutters are effectively spaced apart during the flap forming, said distance corresponding to the varying width of the heel breast face to be covered by the shaped flap. In the gaging device of the illustrative machine provision is made for using as a width gage either the particular heel which is to be attached to the shoe or a heel corresponding thereto in size and style. An edge gage measures the width of the seat face of the heel and transmits the measurement to a detachable cam plate selected for the particular heel style, the shape of this cam plate then determining accurately the required widthwise spacing of the trimming cutters as the work is moved relatively to them.

To minimize the number of cam plates needed and yet enable the machine to shape the heel breast flaps for a great variety of sizes and styles of heels, the illustrative machine is provided with two mechanisms for modifying the width influence of a given cam. One mechanism is used when the heel to be attached is a little wider or narrower in its upper part than the heel for which the cam was intended, and the other is used when the heel to be attached is a little wider or narrower in its lower part than the heel for which the cam plate was intended.

The above briefly-outlined features of the invention and others, together with various novel combinations of parts, will now be more fully described with reference to the accompanying drawings in which, Fig. 1 is a perspective view of the machine in which the invention is herein shown as embodied;

Fig. 3 is a plan view of the illustrative machine, a portion being broken away to reveal construction details;

Fig. 4 is a section on the line IV—IV of Fig. 3;

Fig. 6 is a plan view of the work support, main slide and related parts of the machine;

Fig. 7 is a section on the line VII—VII of Fig. 6;

Fig. 9 is a section on the line IX—IX of Fig. 8, and showing the relation of the main and cross slides of the machine;

Fig. 12 is a view in front elevation of the cutters and their mounting;

Fig. 13 is a section on the line XIII—XIII of Fig. 12;

Fig. 14 is a plan view, on a small scale, of means for equalizing widthwise cutter movements;

Fig. 15 is a view in side elevation indicating means for unclamping a shaped heel breast flap;

Fig. 16 is a view in side elevation and partly in section showing presentation of a shoe for preparation of its heel breast flap; and Fig. 17 is a perspective view of a shoe with its flap as shaped by the machine for attachment to its Louis heel.

Figure 1:
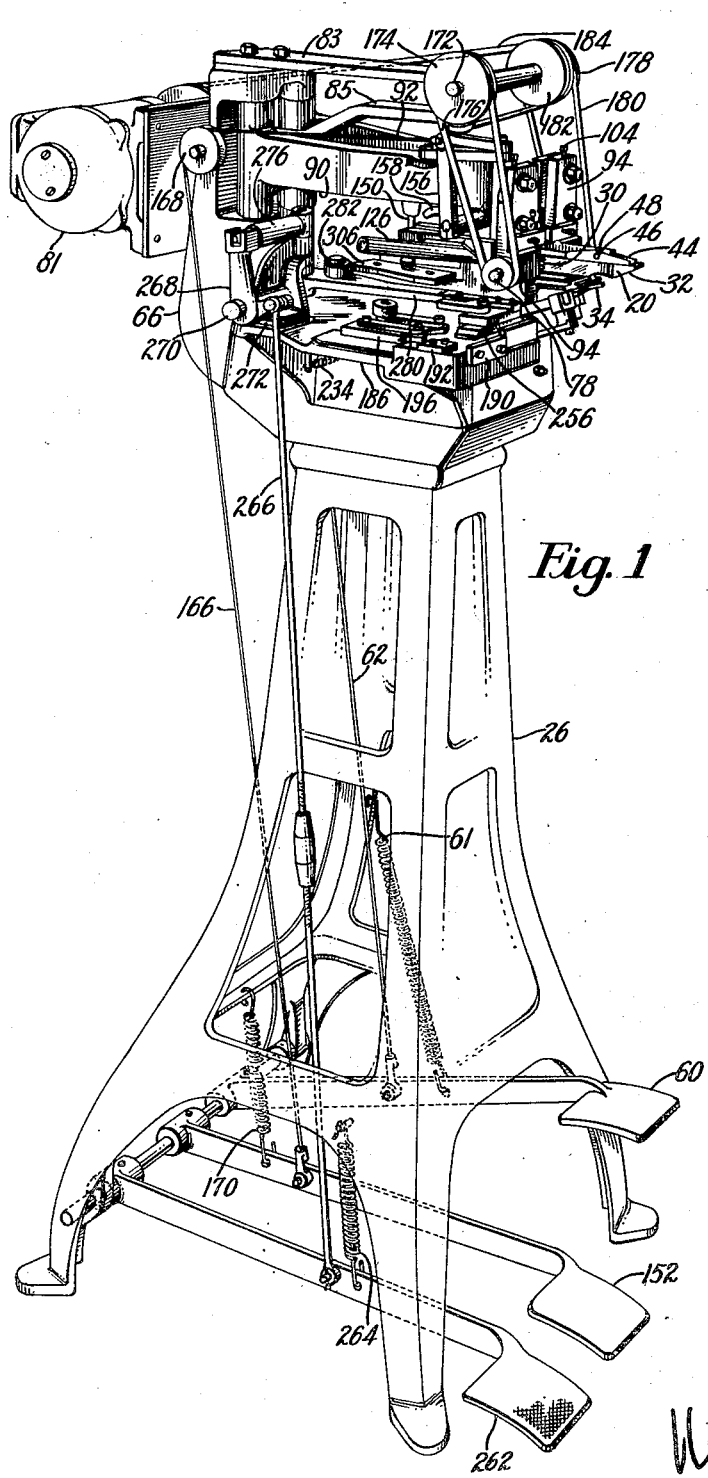
Figure 2:
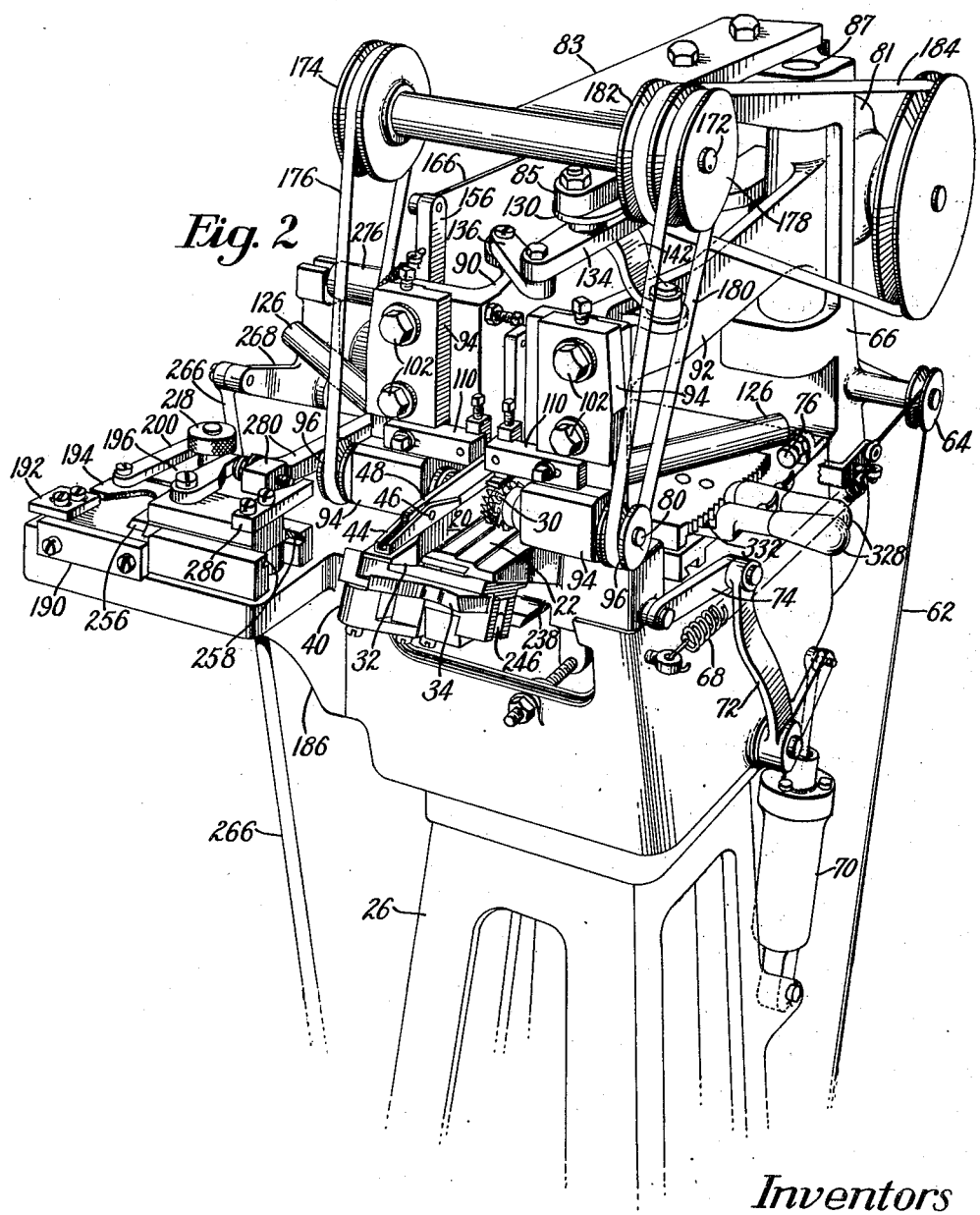
Fig. 2 is a perspective view of the head of the machine shown in Fig. 1, the parts being shown on a larger scale and as seen from a different angle.

For positioning the heel flap F of a sole S (Fig. 16) heightwise in proper relation to the shaping means, the machine is provided at its front with a work support 20 integral with a bracket 22 secured to a main slide 24 (Fig. 6). The latter is mounted for movement from front to rear of the machine in a horizontal guideway 25 formed in the top of a machine frame 26 (Figs. 1 and 2) which is adapted to stand on a floor and thus maintain the support 20 at convenient operating level. A raised and central upper surface 28 of the support is flat, broader toward the front, and is sufficiently narrow rearwardly to accommodate by engagement lengthwise the midportions of the flaps of even the smallest shoe sizes without interfering with the operation of a pair of compound shaping cutters 30, 30 hereinafter to be described. The sides of the support 20 are vertical and its length is ample to sustain the largest Louis heel flap to be operated upon by the machine. The front undersurface 32 (Fig. 16) of the support 20 is inclined downwardly and rearwardly and affords a rest for the heel seat portion of the shoe bottom during the shaping operation. It will be noted that the wedge-like front of the support 20 enables an operator presenting the shoe readily to raise the flap F and to position its longitudinal median line directly over that of the surface 28.

Figures 8, 10, 11:
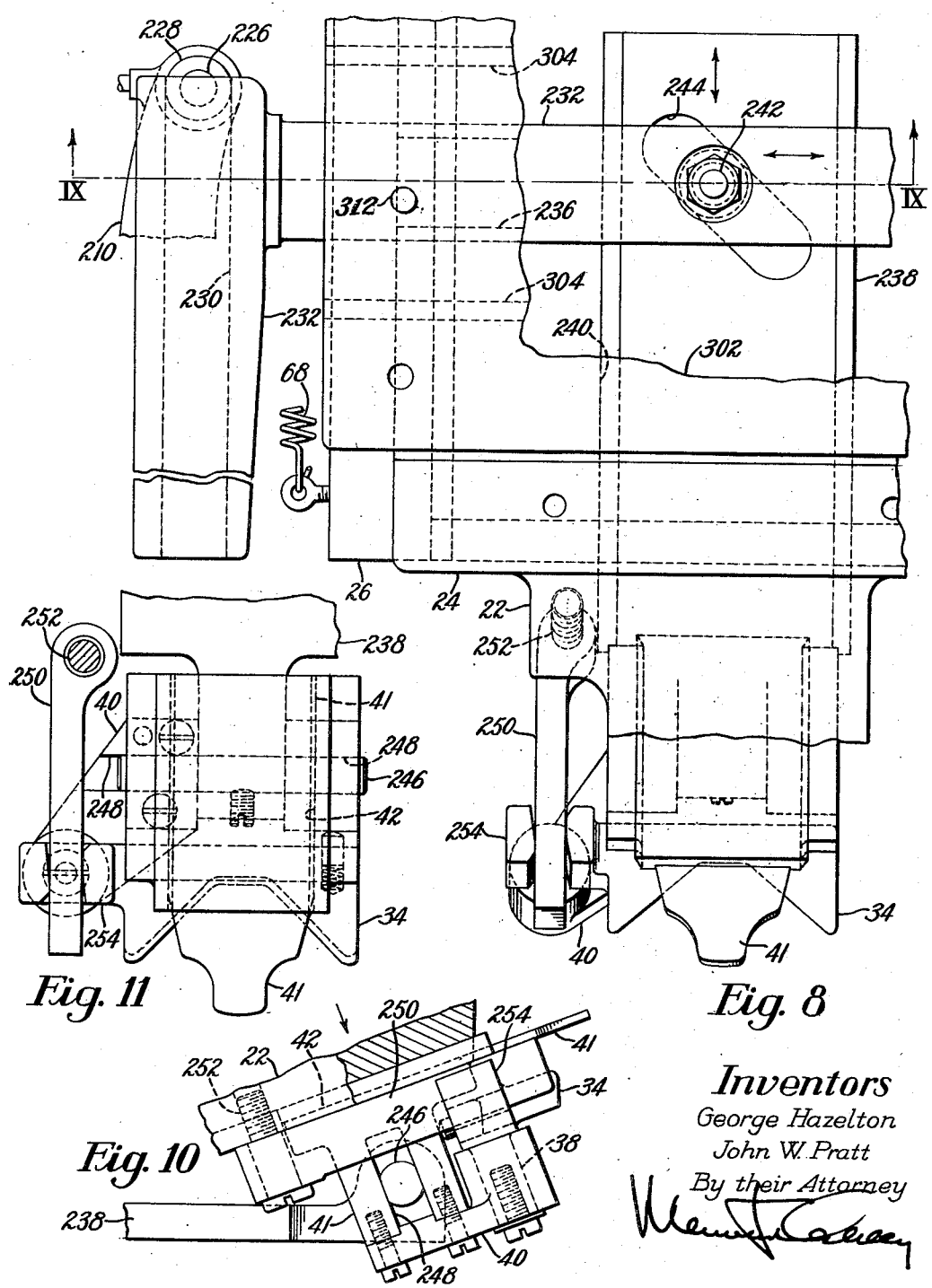
Fig. 8 is a plan view of a portion of the mechanism shown in Fig. 6 but on a larger scale.
Fig. 10 is a view in side elevation of part of the mechanism shown in Fig. 8 and as seen from the left.
Fig. 11 is a view of the mechanism shown in Fig. 10 and looking in the direction of the arrow there indicated.

A V-shaped heel end gage 34 (Figs. 3, 10 and 16) adapted to receive and locate the heel end of the shoe in operative position is adjustably positioned lengthwise thereof and relatively to the support 20 by a gaging device generally designated 36 (Figs. 3 and 5) as will be later described. The gage 34 is carried on a pin 38 fixed in a gage carrier 40, the latter being screwed to a member 41 slidable in ways 42 (Fig. 16) formed in the underside of the bracket 22 and extending lengthwise of the shoe. With the gage 34 in operative position an appropriate length of flap F is determined and overlies the surface 28 for shaping so that in the finished shoe a neat junction is assured between the root of the flap and the base of the heel.

In order to hold the flap pressed against the support 20 and thus prevent the flap from being displaced during operation of the cutters 30, 30, a clamp 44 (Figs. 2 and 15) is arranged to extend above the surface 28. This clamp is pivotally mounted on a pin 46 fixed in the forward portion of a lever 48. The lever 48 is fulcrumed on a pivot 50 mounted in a bracket 52 that is bolted to the bracket 22. A tension spring 54 connects an upward extension of the bracket 52 with the rearward end of the lever 48 thereby normally maintaining the clamp 44 in cooperative work holding relation with the surface 28. Means hereinafter to be described is provided for lifting the clamp 44 from the surface 28 when it is desired to insert or remove a heel breast flap.

While power driven means may be employed to feed the work rearwardly to the cutters 30 the illustrative machine is provided with a treadle 60 (Fig. 1) for this purpose. This treadle is fulcrumed on a rod supported by the machine frame 26 and is suspended therefrom by a tension spring 61. Connected to the treadle 60 is a cable 62 (Fig. 2) extending over a pulley 64 rotatably mounted on a pin fixed in a head bracket 66 secured to the top of the main frame 26. The upper end of the cable 62 is connected to the main slide 24 as shown in Fig. 3. Rearward movement of the slide 24 is effected by depression of the treadle 60 to carry the clamped flap F with its margins equally projecting from the sides of the support 20 toward the cutters 30, 30, return movement of the slide 24 subsequently being effected by oppositely disposed tension springs 68 respectively connecting the frame 26 and the rearward end of the main slide 24. To assure steady cutting action and also an even return motion of the slide 24, a dashpot 70 (Fig. 2) is pivotally secured to a leg of the frame 26. The piston rod of the dashpot 70 is connected to one arm of a bell crank lever 72 fulcrumed on the frame and having its other arm connected by a link 74 to the main slide 24. Limits of lengthwise movement of this slide are determined by adjustable stop screws threaded in the frame 26 and engageable with forward and rearward edge faces respectively of the slide 24, a single screw 76 (Fig. 3) only being shown in the drawings.

The compound cutters 30, 30 (Figs. 3, 12 and 13) are respectively arranged on each side of the support 20, being secured on the respective adjacent end portions of axially alined drive shafts 78, 80. A screw 82 clamps each compound cutter 30 against a shoulder 84 formed on its shaft 78 or 80. Each cutter 30 consists in a multi-toothed skiving portion 86 and a multi-toothed edge trimming portion 88. The skiving portion 86 itself consists of two similarly toothed disks, the teeth all being of equal width but spaced preferably so that each tooth on one disk is opposite a space between adjacent teeth of the other disk. This disposition reduces the danger of tearing thinly skived flaps. Each cutter 30 is mounted for widthwise movement while being rotated with its shaft as will now be described. The head bracket 66 carries a motor 81, a counter-shaft bracket 83, an equalizer bracket 85, and at equal distances widthwise of the support 20, a pair of vertical pivot pins 87 on which equal length cutter arms 90, 92 are respectively mounted for swinging movement together and apart. The arms 90, 92 respectively carry a bracket 94 in which the shafts 78, 80 are respectively journaled. To hold the shafts 78, 80 axially in their brackets 94 a pulley 96 is screwed to the outer end of each of the shafts and they each carry a collar 98. For adjusting each of the cutters 30, 30 heightwise with respect to the work supporting surface 28, the bracket 94 is formed with a tongue 100 (Fig. 3) adapted to slide in a vertical groove formed in the adjacent arm 90 or 92. The bracket 94 is fixedly secured to its arm 90 or 92 by two shoulder bolts 102 respectively extending through slots in the bracket. By loosening the bolts 102 in one of the brackets 94 and adjusting the set screw 104 bearing endwise on the upper bolt 102 either cutter 30 may be moved vertically to modify the depth of skiving and trimming.

In order to brace the side margins of the flap F against the upward cutting thrust of each cutter 30 the brackets 94 are respectively provided with a formed work guide 106 mounted for heightwise and lateral adjustment. Construction details being identical in this respect the arrangement relative to a single guide 106 only will now be explained. The underside 108 (Fig. 12) of the guide is formed to effect suitable engagement between the flesh side of the flap margin and the adjacent cutter 30. A bracket 110 serves to attach a guide 106 adjustably to the adjacent bracket 94. Thus, the bracket 110 is slidably mounted for movement in a horizontal groove 112 formed in the bracket 94 and parallel with the adjacent cutter shaft, the bracket 110 being clamped by a bolt 114 (Fig. 13) threaded into the bracket 94 and extending through a slot 116 in the bracket 110. In like manner the guide 106 slides for adjustment in a vertical groove 118 formed in the bracket 110 and is clamepd by a bolt 120 threaded therein and extending through a slot 122 in the guide 106. Thus each guide 106 can be adjusted horizontally and vertically relative to its adjacent cutter 30. A vertical adjusting screw 124 in each guide bears on the clamping bolt 120 and assists in maintaining the exact work guide setting required by the particular work. For removal of the scrap and dust produced in operating on the flap an exhaust nozzle 126 with connecting tubing is supported by each bracket 94 and disposed behind each cutter 30.

Referring to Figs. 3, 4 and 14, linkage is provided for equalizing and controlling widthwise movements of the cutters 30, 30 together and apart, and in unison. A plate 130 clamped to the fixed bracket 85 supports a stationary pin 132 on which an equalizer lever 134 is pivoted. A link 136 pivotally connected at one end by a pin 138 to the arm 90 is pivotally connected at its other end by a pin 140 to the forward end of the equalizer lever 134. Similarly, a link 142 pivotally connected at one end by a pin 144 to the arm 92 is pivotally connected at its other end by a pin 146 to the rearward end of the lever 134, the arrangement being such that when one cutter 30 is swung in its working range the other cutter 30 is swung through an equal arc but in the opposite direction, and both cutters are maintained equidistant from the sides of the support 20. As will be hereinafter more fully described, the lateral position of the arm 92 and its cutter, and hence of the arm 90 and its cutter, is determined by a roll 150 (Fig. 3) rotatably suspended on a pin carried by the arm 92.

For lifting the clamp 44 from the work supporting surface 28 a treadle 152 (Fig. 1) and mechanism actuated thereby are provided. A horizontal pin 154 pivotally supported by the arm 90 carries an upwardly extending arm 156 at one end and a rearwardly extending arm 158 at the other end thereby constituting an offset bell crank lever 160. A tension spring 162 connecting the arm 90 with the arm 156 urges the latter forwardly and, when the main slide 24 is in its normal forward position, a downward projection of the arm 158 is just above an abutment 164 formed on the rear end of the lever 48. To effect engagement of the arm 158 (Fig. 15) and the abutment 164 so as to raise the clamp 44, the treadle 152 is depressed to rock the bell crank lever 160 by means of a cable 166 extending from said treadle, over a pulley 168 rotatably mounted on the bracket 66, to the arm 156. The treadle 152 is normally held in a raised inoperative position by a tension spring 170 (Fig. 1) suspended from the machine frame 26.

The means for transmitting driving power to the cutters 30, 30 comprises the countershaft bracket 83 (Figs. 1, 2 and 3) extending forwardly to the front of the machine. This bracket is journaled horizontally to carry a rotary countershaft 172. A pulley 174 affixed to one end of the countershaft is connected by a belt 176 to one of the pulleys 96, and a pulley 178 affixed to the other end of the countershaft is connected by a belt 180 to the other pulley 96. The pulleys 174 and 178 are positioned to drive the shafts 78, 80 respectively at any normal operative position of the cutters 30, 30. A drive pulley 182 also mounted on the countershaft is connected by a belt 184 to the pulley of the motor 81.

The gage mechanism 36 (Figs. 3 and 5) now to be fully described, is associated with the illustrative machine for two primary purposes: first, to set the seat gage 34 automatically for a particular heel H, and, second, to determine the widthwise positions of the cutters 30, 30 for every lengthwise position of the main slide 24 during operation on the flap F which is intended to cover the breast of that heel. Secured to the machine frame 26 is a bracket 186 for supporting a table 188. Projecting above the latter and secured thereto by screws are a breast stop 190 for abutting the breast of the heel H to be attached to the shoe (or a heel such as might be attached to the shoe) and a side stop 192 for abutting the side of the heel H when placed base down on the table 188. A V-shaped gage 194 is floatingly arranged to engage the rear of the heel engaging the stops 190, 192 thus measuring the length of the heel base. A gage slide 196 is mounted for lengthwise movement, i. e., forwardly or rearwardly, in a guideway 198 formed in the bracket 186. The slide 196 is connected to the gage 194 by a pair of equal and parallel links 200, 200 having their respective corresponding ends mounted pivotally on vertical pins 202, 202 and 204, 204 affixed to the gage slide 196 and the V gage 194. The latter is thus free to accommodate itself to any size heel even though its longitudinal median line may be at different distances from the side stop 192. A tongue 206 on the V gage 194 slides in a horizontal groove 208 formed in the slide 196 hereby tending to prevent insertions and removals of heels from straining the gage mechanism.

Figure 5:
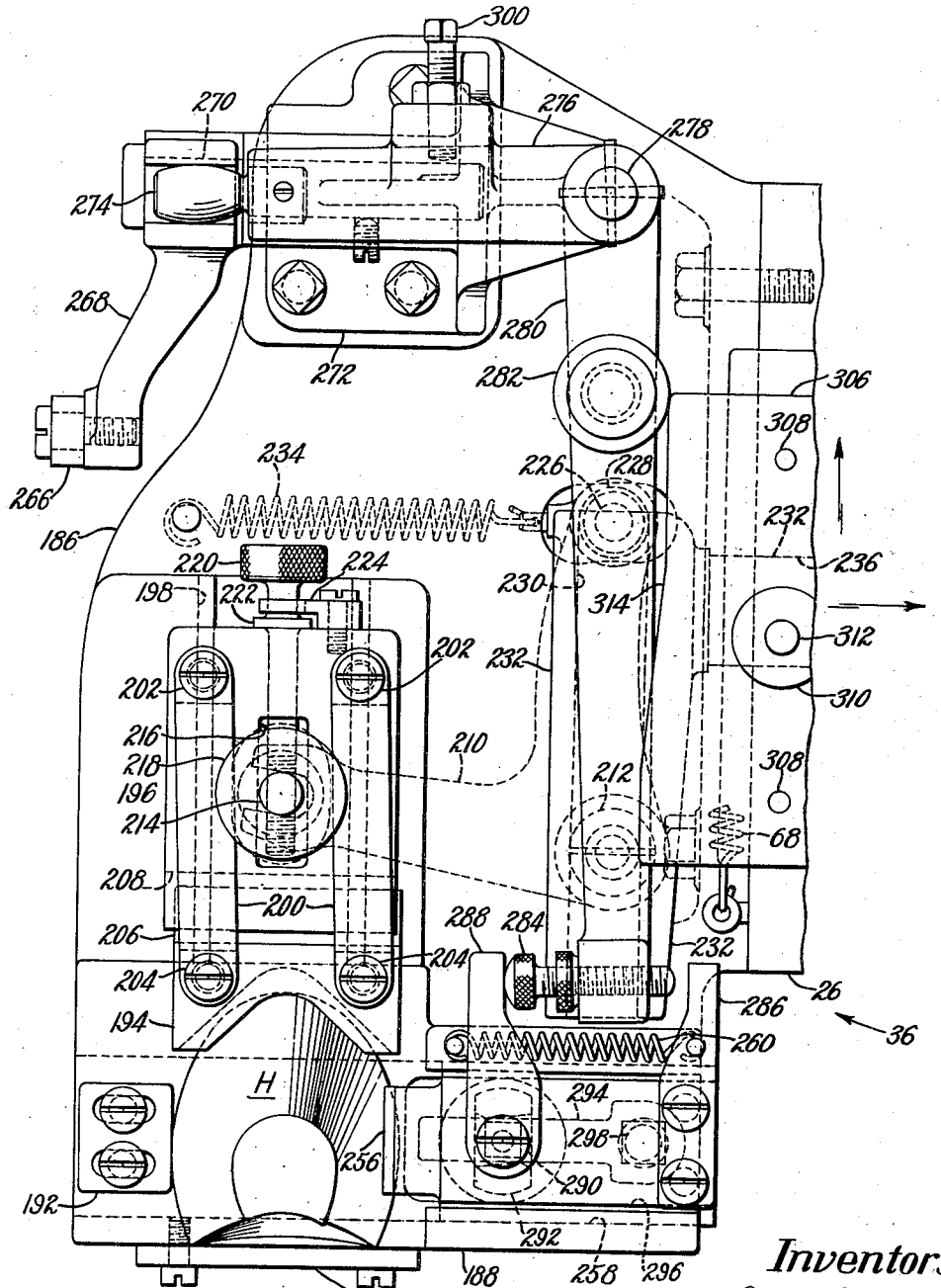
Fig. 5 is a plan view showing on an enlarged scale gaging mechanism seen in Fig. 3.

For transmitting movement of the V gage 194 to the seat gage 34 a bell crank lever 210 (Figs. 3 and 5) is pivotally mounted on a pin 212 fixed in the bracket 186, and a forked end of one arm of the lever 210 straddles the lower end of a vertical pin 214 extending upwardly through a closed slot 216 extending forwardly and rearwardly in the gage slide 196. Flats formed on the pin 214 engage the sides of the slot and a shoulder on the pin engages the underside of the slide 196. A lock nut 218 and washer are threaded on the pin 214 to engage the upper surface of the slide and thus clamp the pin in any selected position lengthwise of the slot. When, as in the case of some unusual shoes, the seat gage 34 is not properly positioned when the V gage 194 abuts a heel H contacting the stops 190, 192, the gage 34 may be adjusted to its proper position as will hereinafter become clear by shifting the pin 214 lengthwise of the slot 216. Such shifting is effected by means of a knurled headed screw 220 carrying a collar 222 and extending through a hole in the slide 196, the screw 220 being threaded through the pin 214. The collar 222 is restrained from axial movement by an end of the slide 196 and a flange 224 secured thereto. Accordingly, when the lock nut 218 is released the pin 214 may be shifted by rotating the screw 222. The rearward arm of the bell crank lever 210 carries a pin 226 which extends upwardly through an opening in the bracket 186 and rotatably supports a roll 228 (Figs. 3, 5 and 9). The latter is arranged in a straight cam track 230 formed in a slide bar 232, the track extending parallel to the path of the main slide 24. A tension spring 234 connecting the lever 210 with the bracket 186 urges the V gage 194 toward the breast stop 190. The bar 232 slides horizontally in a lateral slideway 236 formed in the main slide 24 and extending at right angles to the track 230. A seat gage slide 238 (Figs. 6, 8 and 9) operatively connected to the seat gage 34, as will be explained, is disposed for forward and rearward movement in a horizontal guideway 240 formed in the main slide 24. A pin 242 in the slide bar 232 supports a roll that engages the walls of a cam slot 244 formed angularly in the seat gage slide 238 so that lateral movement of the bar 232 as effected by the heel gage slide 196 (and hence by the particular heel H) results in forward or rearward adjustment of the seat gage slide 238 relatively to the main slide 24.

A pin 246 (Figs. 10, 11) projecting horizontally from the sides of the seat gage slide 238 engages parallel inclined ways 248 in the sides of the member 41. As a consequence forward movement of the seat gage slide 238 causes forward and upward movement of the seat gage 34, but rearward movement of the slide 238 adjusts the gage 34 downwardly and rearwardly. The operative position of the gage 34 relative to the work support 20 is thus seen to be dependent on the particular heel H inserted in the machine and as measured by the V gage 194. For preventing pressure applied to the seat gage 34 (as by means of manual pressure exerted via the shoe itself) from moving it relatively to the support 20 a locking mechanism is provided comprising a tongue 250 (Figs. 5, 8, 10 and 11) pivotally mounted at one end on a pin 252 secured to the work support bracket 22. The tongue 250 is received by a close fitting fork 254 attached to the seat gage 34, the fork normally being free to slide on the tongue from one gage position to another. Should the gage 34 be rocked slightly about the pin 38, the fork 254 immediately cramps against movement relatively to the tongue and prevents displacement of the gage 34.

For controlling the cutters 30 in their widthwise movements the gage mechanism 36 also comprises means for measuring the width of the base of the heel H and means including a cam associated with this measuring means for determining appropriate spacing of the cutters throughout the feeding movement of the work. Both of these means are operatively connected with the above-mentioned roll 150 as will now be explained. A side gage 256 is slidable in ways 258 (Fig. 2) formed in the table 188 and extending laterally of the machine. A tension spring 260 (Figs. 3 and 5) having one end anchored to the table and the other end connected to the side gage 256 urges it toward the side stop 192. To permit ready insertion of a heel H the gage 256 is retracted against the resistance of the spring 260 by means of a treadle 262 (Fig. 1) arranged to be depressed in opposition to a return spring 264 suspended from the machine frame. The treadle 262 is connected by a rod 266 to one arm of a bell crank lever 268 pivotally mounted on a pin 270 affixed in a bracket 272 supported by the bracket 186. The other arm of the lever 268 has a forked end that engages a pin 274 fixed in the end of a lever 276. The latter is fixed to the upper end of a pivot pin 278 journaled in the bracket 186. Secured to the lower end of the pin 278 is a lever 280 which projects forwardly to support a cam roll 282, employed as hereinafter explained, and an adjustable stop screw 284. When the lever 280 is swung to the right, as viewed in Fig. 5, by depression of the treadle 262 the screw 284 engages an abutment 286 fixed to the side gage 256 and moves it to the right. When the lever 280 is swung to the left the screw 284 engages a locking lever 288 carried by the square head of a pin 290 and locks the gage 256 against lateral movement by means of the torque thus applied to the pin 290. For this purpose the latter is mounted vertically in the gage 256 and carries on its lower end a fork 292 which straddles a tongue 294 extending beneath the side gage 256 and in a recess 296 formed in the table 188. The right hand end of the tongue 294, as seen in Fig. 5, is fulcrumed on a pin 298 secured to the table. With no torque applied to the pin 290 the tongue 294 is slidable in the fork 292; a locking torque is normally derived from mechanism about to be described although it will now be apparent that the gage 256 cannot thereby be shifted so as to mar or squeeze the heel H. To limit the extent to which the slide 256 may be shifted away from the side stop 192 a stop screw 300 adjustably carried in a lug projecting from the lever 276 abuts the bracket 272.

A cross slide 302 extending widthwise of the machine is supported in a laterally disposed guideway 304 formed in the top of the main slide 24. A cam plate 306 is detachably mounted on the cross slide 302 by means of two dowel pins 308 fixed in the cross slide and a clamping nut 310 threaded on a stud 312 secured to the cross slide and projecting through a hole in the cam plate. A cam face 314 of the plate 306 is disposed for cooperation with the roll 282, the plate being urged into cooperative relation by a tension spring 316 (Figs. 3, 6) anchored to the main slide 24 and to the cross slide 302. The spring 316 also maintains, unless the treadle 262 is depressed, a pressure contact between the screw 284 and the lever 288 serving to hold the side gage 256 locked. The latter, being positioned by the width of the heel H, thus initially determines the lateral position of the cross slide 302 within the adjustable range of the set screw 284. The cam plate 306 operatively engages the roll 282 throughout the feeding movement of the main slide 24 and hence the contour of the selected cam face 314 determines the position of the cross slide 302 for each lengthwise position of the main slide 24. For limiting movement of the cutters 30, 30 toward the support 20 when the cam plate 306 is removed or no heel H is in the machine, a stop screw 317 (Fig. 12) threaded into the arm 90 is arranged to engage the arm 92.

The roll 150 (Figs. 6 and 7), operatively connected as above described to the arm 92 for varying the distance apart of the cutters 30, 30 is arranged to move in a straight cam track 318 formed in a cam piece 320 adjustably mounted in the cross slide 302. Flange clamping members 322, 322 affixed to the cross slide 302 are arranged to hold the cam piece 320 thereon in a lengthwise, i. e. extending forwardly and rearwardly, position in which its ends may be independently shifted widthwise to the right or left as a means of slightly modifying the influence of the cam plate 306. To fix the cam track 318 for a particular heel H a bias pin 324 is rotatably affixed in the cross slide 302 beneath each end of the track. An eccentric 326 on each pin 324 engages a hole in the corresponding end of the cam piece 320 and an adjusting lever 328 integral with each eccentric 326 extends from the side of the machine to afford an operating handle. A spring-backed ratchet pin 330 in each lever handle is urged into holding engagement with the teeth of a ratchet 332 formed concentrically with its corresponding bias pin 324, the ratchets being portions of a plate bolted to an end of the cross slide 302. Thus the arrangement is such that when the levers 328 are disposed centrally of their respective ratchets 332, the cam track 318 extends lengthwise in a manner imposing no widthwise adjustment of the cutters 30, 30 other than that effected by the cam plate 306 during the travel of the main slide 24. Either or both ends of the cam track 318 may be shifted to right or left by swinging either or both of the levers 328 from their central positions relative to the ratchet 332, thereby causing the cutters 30, 30 to follow an operative path different from that obtained from the cam face 314 alone. Accordingly a single cam plate 306 may be used for a number of variations in shape in the heels.

A brief résumé of the operation of the illustrative machine may assist in more fully understanding the invention. An operator, wishing to prepare the heel breast flap F of a sole attached to a shoe for covering the breast of a Louis heel H, will first insert that heel in the gage mechanism 36, depressing the treadle 262 and displacing the V gage 194 for this purpose if necessary. The seat gage 34 will be adjusted relatively to the work support 20 by the positioned V gage 194. Having selected and installed a cam plate 306, the operator adjusts the bias levers 328 if necessary. He also adjusts or changes the work guides 106 to produce the desired edge thickness and angle of skive in the margins of the finished flap F. The treadle 152 is depressed to lift the clamp 44 from the work support 20 and the shoe is then presented to the machine as above described, the treadle 152 being released when the flap F has been properly positioned. With the cutters 30, 30 rotating in the direction indicated in Fig. 16, the treadle 60 is depressed to move the main slide 24 and work support 20 rearwardly, the latter moving between the cutters 30, 30 to feed the margins of the flap beneath the work guides 106 and over the respective cutters. During this feeding movement the operator continues to support the shoe by hand, and the gage mechanism 36, the cam plate 306, and possibly the biasing means controlled by the levers 328 determine the widthwise spacing of the cutters which skive and trim progressively to form the flap as shown in Fig. 17 and required by the particular shape of the heel breast.

When the main slide 24 engages its rear stop 76 the breast flap margins will have been carried past the respective cutters 30, 30 to the extent determined by the seat gage 34, a distance corresponding to the length of the heel seat as measured by the V gage 194. The treadle 60 is then released to allow return of the slide 24 under the action of the springs 68. Finally, the treadle 152 is again depressed to release the formed flap and the shoe is ready for attachment and breast covering of its Louis heel.

Having thus described our invention, what we claim as new and desire to secure by Letters Patent of the United States is:

1. A machine for shaping the heel flap of a sole attached to a shoe comprising a work support having a wedge-shaped portion adapted to abut the heel end of the shoe bottom while engaging the longitudinal central portion of the flesh side of the flap, a pair of compound rotary cutters respectively having skiving and trimming portions, work guides respectively mounted adjacent to the operative portions of the cutters and adapted to move therewith, means for moving the support to feed the side margins of the flap lengthwise between the respective cutters and adjacent work guides, and work-clamping means cooperative with the work support to maintain the flap in extended condition during the operation of said cutters.

2. A machine as set forth in claim 1 further characterized in that said cutters are mounted for movement together and apart in unison and widthwise of the shoe.

3. A machine for shaping the heel flap of a sole attached to a shoe comprising a work support engageable lengthwise with the flap between its margins and having a surface disposed to abut the heel seat of the shoe, means for moving the support to carry the flap lengthwise, a pair of compound cutters each having skiving and trimming elements movable widthwise in unison toward and from the path of said support for progressive operation on the flap margins, and mechanism cooperative with said support moving means for controlling said cutter movements widthwise during lengthwise feeding of the flaps.

4. A machine for shaping the heel flap of a sole attached to a shoe comprising a work support engageable with the flap between its margins and with the heel seat of the shoe bottom, a pair of skiving cutters mounted for movement together and apart widthwise of a shoe thus positioned, a pair of trimming cutters respectively arranged adjacent to those portions of said skiving cutters spaced widest apart and respectively mounted for widthwise movements therewith, means for relatively moving the work support and all of said cutters to cause each skiving cutter and adjacent trimming cutter to operate lengthwise of a flap margin, a work guide adjustably mounted adjacent to the operative portions of adjacent cutters to brace each margin, a device for measuring the base width of a heel having a breast to be covered by the shaped flap, and mechanism connecting said device with said means to control the widthwise movements of the adjacent cutters.

5. A machine for shaping the heel flap of a sole attached to a shoe comprising a work support having portions respectively arranged to abut the heel seat and to engage the flap between its side margins, a pair of compound rotary cutters mounted for equalized movement together and apart widthwise of the shoe, a gage adapted to receive the heel end of the shoe, said gage being adjustably mounted with respect to the work support to determine the extent of its lengthwise engagement with the flap, means for moving the work support between the cutters to carry the flap margins progressively lengthwise into operative engagement therewith, and gage mechanism responsive to its measurements of the width and length of the heel to be attached to said shoe for respectively controlling the widthwise movements of the cutters and the lengthwise adjustment of said gage.

References Cited in the file of this patent

UNITED STATES PATENTS

| Number | Name | Date |
|---|---|---|
| 1,384,804 | Johnson | July 19, 1921 |
| 1,394,905 | Johnson | Oct. 25, 1921 |